(12) United States Patent
Harada et al.

(10) Patent No.: US 12,479,250 B2
(45) Date of Patent: Nov. 25, 2025

(54) TRAVELING CAR

(71) Applicant: KAWASAKI JUKOGYO KABUSHIKI KAISHA, Kobe (JP)

(72) Inventors: Yudai Harada, Kobe (JP); Masato Yamamoto, Kobe (JP)

(73) Assignee: KAWASAKI JUKOGYO KABUSHIKI KAISHA, Kobe (JP)

(*) Notice: Subject to any disclaimer, the term of this patent is extended or adjusted under 35 U.S.C. 154(b) by 281 days.

(21) Appl. No.: 18/287,594

(22) PCT Filed: Apr. 22, 2022

(86) PCT No.: PCT/JP2022/018615
§ 371 (c)(1),
(2) Date: Oct. 19, 2023

(87) PCT Pub. No.: WO2022/225059
PCT Pub. Date: Oct. 27, 2022

(65) Prior Publication Data
US 2024/0208288 A1    Jun. 27, 2024

(30) Foreign Application Priority Data

Apr. 23, 2021   (JP) .................................. 2021-073542

(51) Int. Cl.
*B60G 3/14*    (2006.01)
*B60G 7/02*    (2006.01)
(Continued)

(52) U.S. Cl.
CPC ................ *B60G 7/02* (2013.01); *B60G 11/00* (2013.01); *B60K 17/00* (2013.01); *B60G 3/145* (2013.01); *B60G 2204/143* (2013.01); *B60K 1/02* (2013.01)

(58) Field of Classification Search
CPC . B60G 3/145; B60G 7/00; B60G 7/02; B60G 11/00; B60G 2204/143; B60K 1/02; B60K 17/32
See application file for complete search history.

(56) References Cited

U.S. PATENT DOCUMENTS 5,036,941 A    8/1991  Denzin et al.
2022/0048588 A1*  2/2022  Moroni ................ B62K 25/283
(Continued)

FOREIGN PATENT DOCUMENTS

CN    209505378 U    10/2019
JP    S57-171927 U   10/1982
(Continued)

OTHER PUBLICATIONS

Jul. 12, 2022 International Search Report issued in International Patent Application No. PCT/JP2022/018615.
(Continued)

*Primary Examiner* — Erick R Solis
(74) *Attorney, Agent, or Firm* — Oliff PLC

(57) ABSTRACT

A traveling car includes a car body and a driver. The driver has a motor that is attached to the car body, a drive wheel, a support that supports the drive wheel, and a transmission that transmits rotary drive force to the drive wheel. The support has a holder that rotatably supports the drive wheel and is attached to the car body so as to rotate about a rotation axis M extending in the horizontal direction. The transmission has an output pulley that is coupled to the motor and is located on the car body, an input pulley that is coupled to the drive wheel and is located on the holder, and a belt wound around the output pulley and the input pulley. The rotation axis M is located coaxial with the output pulley.

9 Claims, 5 Drawing Sheets

(51) Int. Cl.
  *B60G 11/00*   (2006.01)
  *B60K 17/00*   (2006.01)
  *B60K 1/02*    (2006.01)

(56)              References Cited

U.S. PATENT DOCUMENTS

2022/0118807 A1* 4/2022 Pan .................. B60G 13/003
2025/0206096 A1* 6/2025 Kroiss ................ B60G 3/145

FOREIGN PATENT DOCUMENTS

JP      S60-16666 U     2/1985
JP      H02-182539 A    7/1990
JP      H07-040355 U    7/1995
JP      2008-238959 A   10/2008
JP      6808884 B1      1/2021

OTHER PUBLICATIONS

Oct. 24, 2023 International Preliminary Report on Patentability issued in International Patent Application No. PCT/JP2022/018615.

* cited by examiner

TRAVELING CAR

FIELD

The technique disclosed herein relates to a traveling car.

BACKGROUND

Conventionally, a traveling car including a drive wheel to be driven by a drive source such as a motor has been known. For example, Patent Document 1 discloses a traveling car including a motor, a drive wheel, and a belt that transmits rotation of the motor to the drive wheel. The motor and the drive wheel are attached to an attachment plate. The attachment plate is supported on the bottom of the traveling car so as to rotate about an axis extending in the horizontal direction. In addition, the attachment plate is elastically coupled to the bottom of the traveling car via a suspension. By the elastic force of the suspension, the drive wheel reliably contacts a road surface. Even if the road surface has asperities, the elasticity of the suspension absorbs the asperities of the road surface, and accordingly, a state of the drive wheel contacting the road surface is maintained.

CITATION LIST

Patent Document

Patent Document 1: Japanese Unexamined Patent Application Publication No. 2008-238959

SUMMARY OF THE INVENTION

In the configuration in which the drive wheel is elastically pressed against the road surface as in the above-described traveling car, the drive wheel moves up and down according to, e.g., the asperities of the road surface during traveling. Specifically, the attachment plate to which the drive wheel is attached moves up and down. Since the motor is also attached to the attachment plate, the motor also moves up and down. That is, the substantially same vibration as that of the drive wheel is transmitted to the motor.

The technique disclosed herein has been made in view of the above-described point, and an object thereof is to reduce vibration of a drive wheel transmitted to a motor while ensuring contact of the drive wheel with the ground.

A traveling car disclosed herein includes a car body and a driver that causes the car body to travel. The driver has a drive source that is attached to the car body and outputs rotary drive force, a drive wheel, a support that supports the drive wheel, and a transmission that transmits the rotary drive force to the drive wheel. The support has a holder that rotatably supports the drive wheel and is attached to the car body so as to elastically rotate about a rotation axis extending in the horizontal direction. The transmission has an output pulley that is coupled to the drive source and is located on the car body, an input pulley that is coupled to the drive wheel and is located on the holder, and a belt wound around the output pulley and the input pulley. The rotation axis is located coaxial with the output pulley.

According to the traveling car, vibration of the drive wheel transmitted to the motor can be reduced while ensuring contact of the drive wheel with the ground.

DESCRIPTION OF EMBODIMENTS

Figure 1:
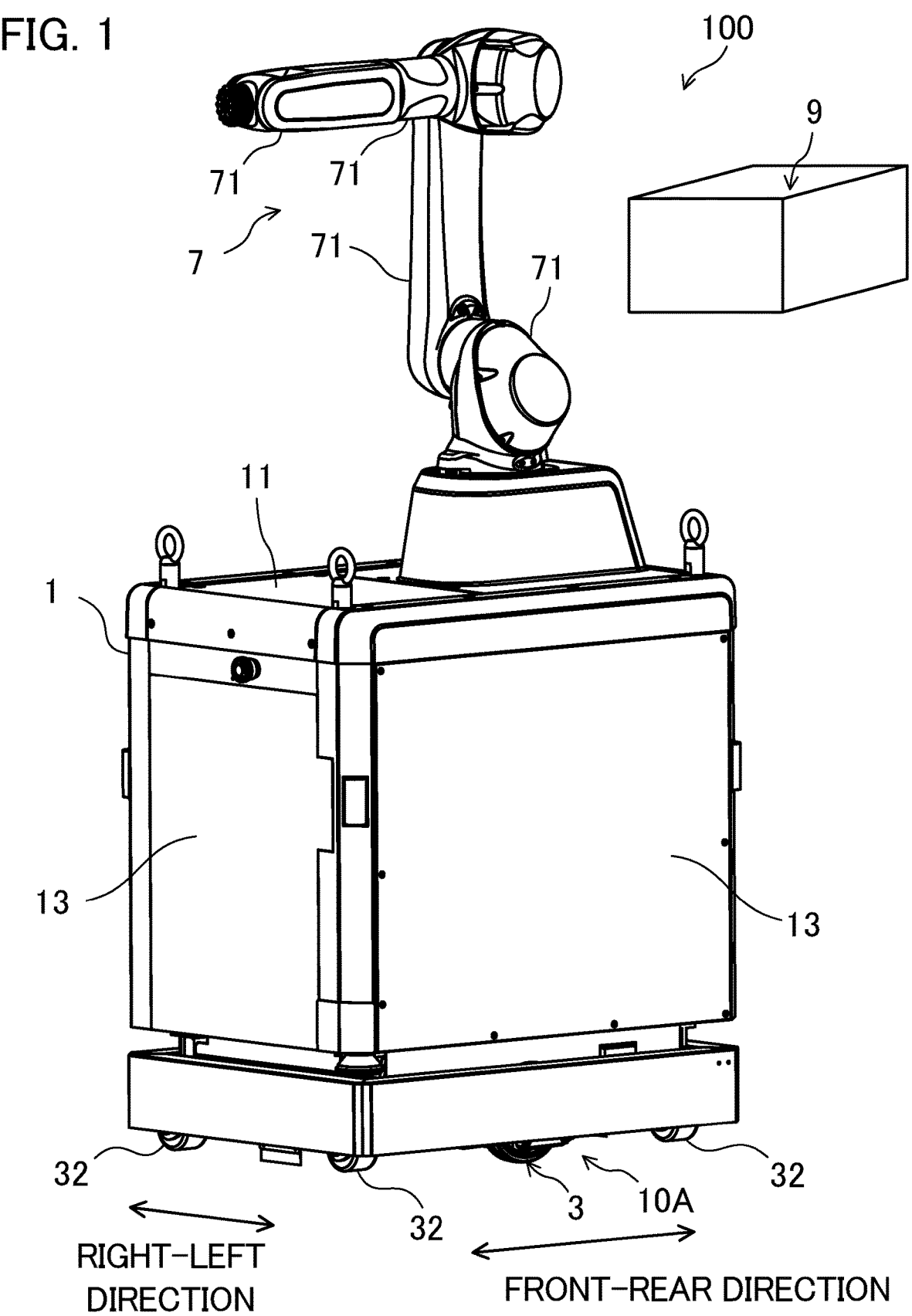
FIG. 1 is a perspective view of a traveling car diagonally from above.
Figure 2:
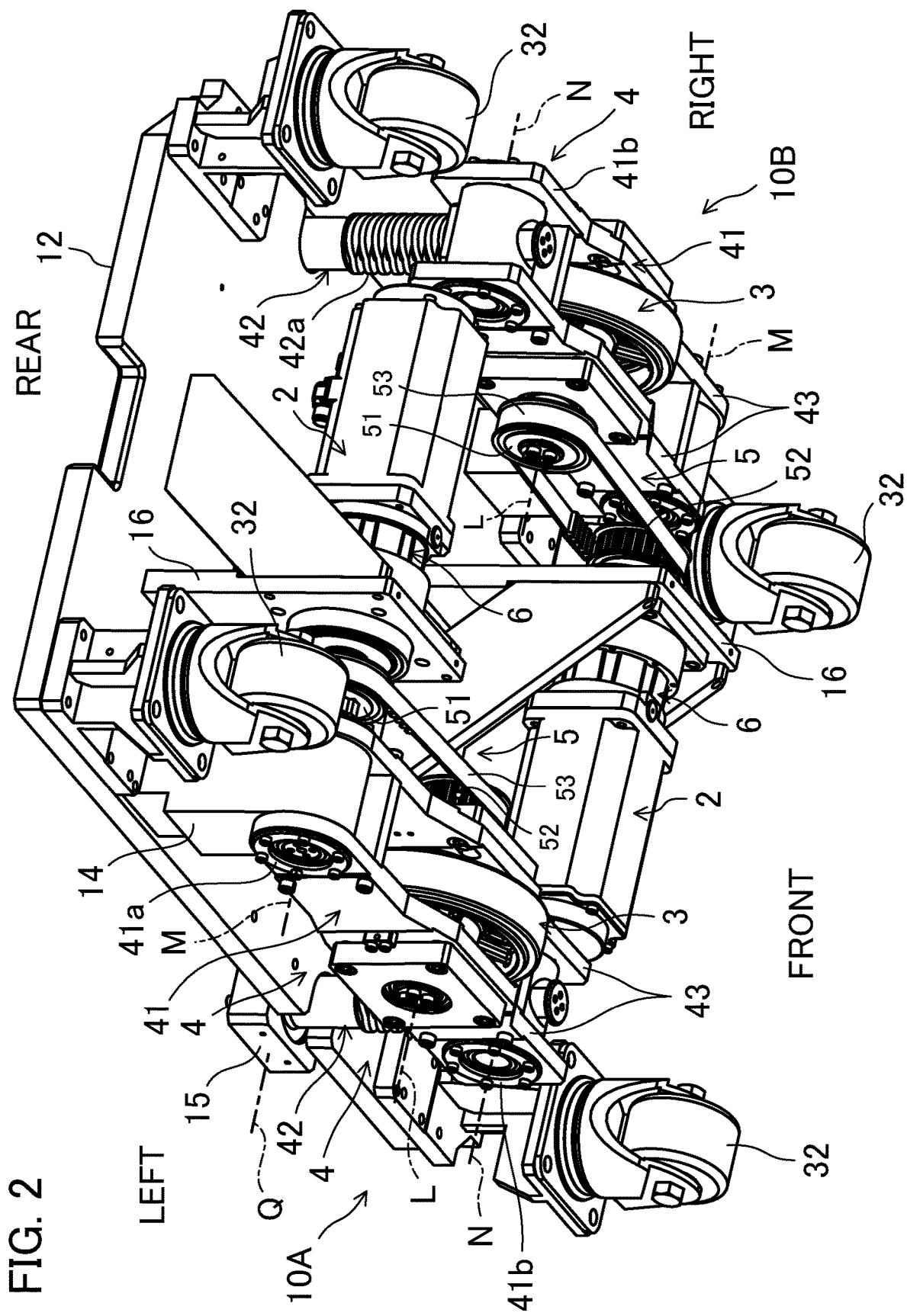
FIG. 2 is a perspective view of a bottom plate of the traveling car.
Figure 3:
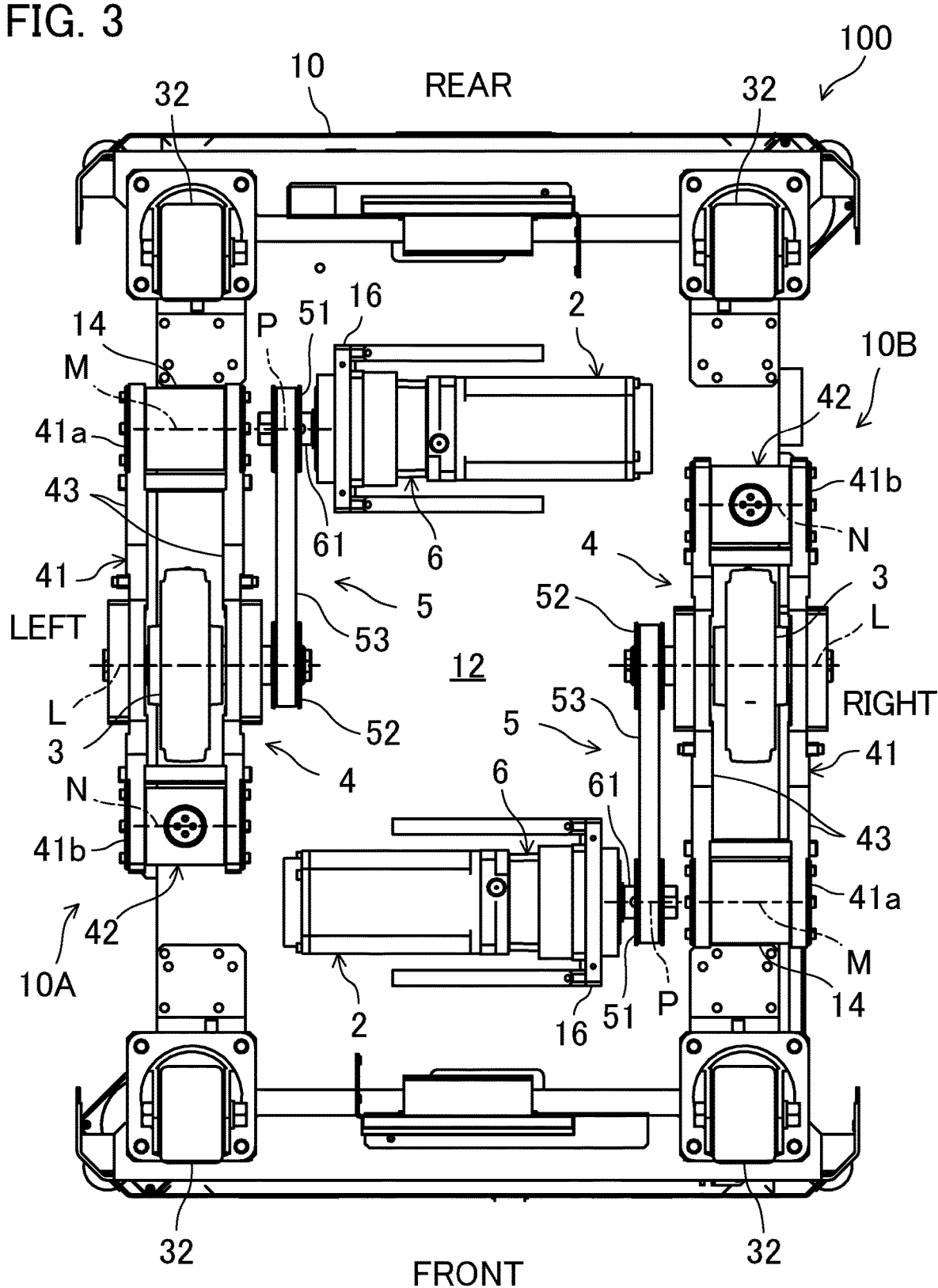
FIG. 3 is a bottom view of the traveling car.
Figure 4:
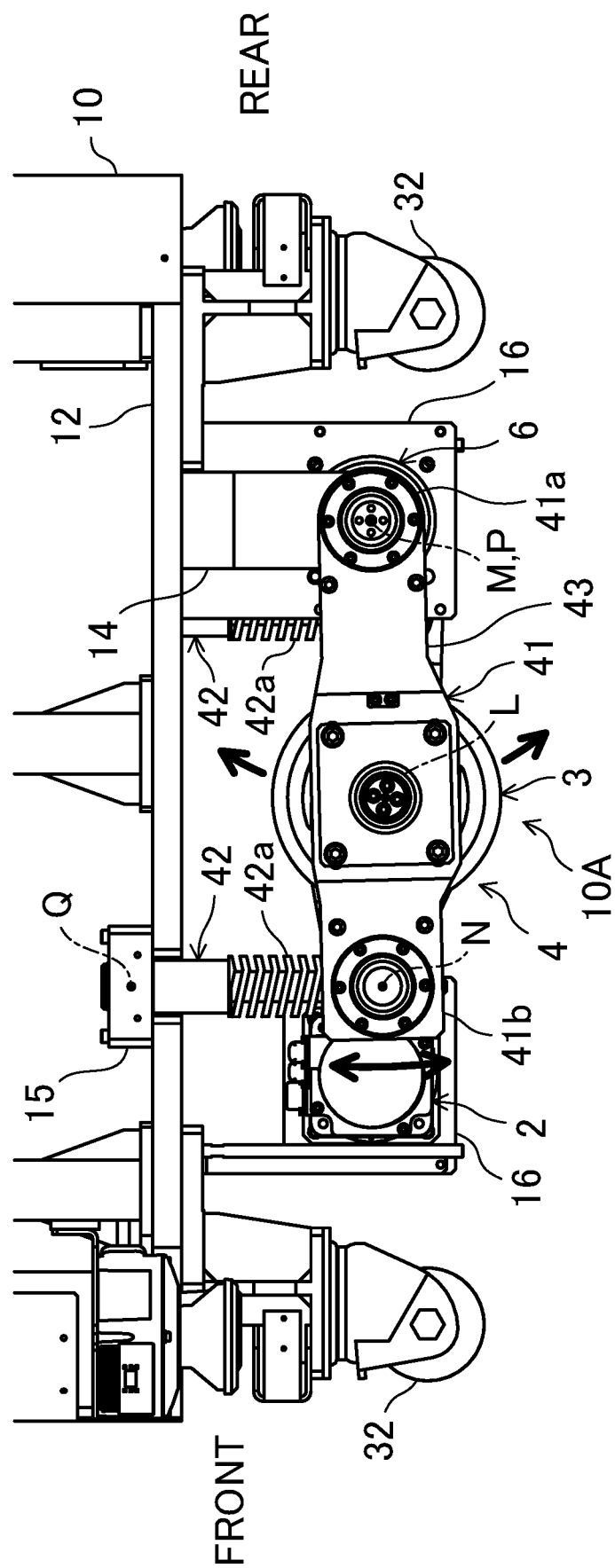
FIG. 4 is a side view of a lower portion of the traveling car from the left side.

Hereinafter, an exemplary embodiment will be described in detail with reference to the drawings. FIG. 1 is a perspective view of a traveling car 100 diagonally from above. FIG. 2 is a perspective view of a bottom plate 12 of the traveling car 100. FIG. 3 is a bottom view of the traveling car 100. FIG. 4 is a side view of a lower portion of the traveling car 100 from the left side.

The traveling car 100 is a self-propelled traveling device. For example, the traveling car 100 is an automated guided vehicle (AGV). The traveling car 100 includes a car body 1 and a driver that causes the car body 1 to travel. The driver includes a first driver 10A and a second driver 10B. The traveling car 100 is controlled by a controller 9. For example, the traveling car 100 is used for transporting workpieces, which are sequentially transported by a conveyor, to a shelf.

The car body 1 is substantially in a rectangular parallelepiped shape. The car body 1 has a top plate 11, the bottom plate 12, and four side plates 13. The top plate 11 and the bottom plate 12 are aligned in the upper-lower direction. The four side plates are located so as to face four front, rear, right, and left sides. Each of the top plate 11, the bottom plate 12, and the four side plates 13 is substantially in a quadrangular shape. The first driver 10A and the second driver 10B are disposed on the lower surface of the bottom plate 12.

The traveling car 100 further includes driven wheels 32. Specifically, the traveling car 100 includes four driven wheels 32. Each driven wheel 32 is rotatable about an axis extending in the horizontal direction. The four driven wheels 32 are disposed at four corners of the bottom plate 12 on the lower surface thereof. Each driven wheel 32 is attached to the bottom plate 12 so as to rotate about an axis extending in the vertical direction. That is, each driven wheel 32 can change a traveling direction 360 degrees in the horizontal direction.

The traveling car 100 further includes a robot arm 7 mounted on the car body 1. The robot arm 7 is disposed on the top plate 11. The robot arm 7 has links 71. The links 71 are rotatably coupled to each other via joints. Each joint is driven by a servo motor. An end effector is coupled to the tip end of the robot arm 7.

The first driver 10A and the second driver 10B have a similar configuration except for location on the car body 1. Thus, a basic configuration of the first driver 10A will be described, and for the second driver 10B, overlapping description thereof will be omitted.

The first driver 10A has, as shown in FIGS. 2 and 3, a motor 2 that is attached to the car body 1 and outputs rotary drive force, a drive wheel 3, a support 4 that supports the drive wheel 3, and a transmission 5 that transmits the rotary drive force to the drive wheel 3. The first driver 10A may further have a reducer 6 that is coupled to the motor 2 and reduces the speed of the rotary drive force. The motor 2 is one example of a drive source.

Hereinafter, for the sake of convenience in description, the traveling direction of the traveling car 100, i.e., the rolling direction of the drive wheel 3, will be referred to as a front-rear direction. A horizontal direction perpendicular to the front-rear direction will be referred to as a right-left direction or a car width direction.

The support 4 has a holder 41 that rotatably supports the drive wheel 3 and is attached to the car body 1 so as to rotate about a rotation axis M extending in the horizontal direction. The support 4 further has a suspension 42 that elastically supports the holder 41 on the car body 1 such that the holder 41 is rotatable about the rotation axis M.

The holder 41 includes two plates 43. The plates 43 extend in the front-rear direction. The two plates 43 face each other in the right-left direction with an interval therebetween. The drive wheel 3 is located between the two plates 43. The two plates 43 support the drive wheel 3 such that the drive wheel 3 is rotatable about a rotation axis L extending in the horizontal direction.

The holder 41 has a fixed end portion 41a which is one end portion in the front-rear direction and a movable end portion 41b which is the other end portion in the front-rear direction. The fixed end portion 41a is attached to a column 14 extending from the car body 1 (specifically, bottom plate 12) so as to rotate about the rotation axis M. The column 14 is fixed to the bottom plate 12. The movable end portion 41b is attached to a lower end portion of the suspension 42 so as to rotate about a rotation axis N. The rotation axis L, the rotation axis M, and the rotation axis N are parallel with each other, and extend in the car width direction.

The suspension 42 has a spring 42a that extends and contracts in the longitudinal direction of the suspension 42. The suspension 42 is attached to the car body 1 so as to rotate about a rotation axis Q parallel at least with the rotation axis M. In this example, the suspension 42 is attached to the car body 1 via a spherical plain bearing 15. Specifically, the spherical plain bearing 15 is attached to the bottom plate 12. An upper end portion of the suspension 42 is supported on the spherical plain bearing 15. The suspension 42 is supported on the spherical plain bearing 15 with the longitudinal direction of the suspension 42 in the vertical direction. The suspension 42 is supported so as to rotate in an arbitrary direction by the spherical plain bearing 15, and therefore, is also rotatable about the rotation axis Q.

When the suspension 42 extends and contracts in the longitudinal direction thereof, the movable end portion 41b of the holder 41 moves according to the lower end portion of the suspension 42. As a result, the holder 41 rotates about the rotation axis M. The suspension 42 is attached to the car body 1 so as to rotate about the rotation axis Q parallel with the rotation axis M, and therefore, rotates about the rotation axis Q relative to the car body 1 along with rotation of the holder 41 about the rotation axis M.

The drive wheel 3 also rotates along with rotation of the holder 41. The trajectory of the drive wheel 3 is precisely in an arc shape about the rotation axis M. However, the longitudinal direction of the suspension 42 is in the vertical direction and extension and contraction of the suspension 42 is slight, and for this reason, the trajectory of the drive wheel 3 is substantially in a linear shape extending substantially in the vertical direction.

When the spring 42a of the suspension 42 is in a natural state, the lower end of the drive wheel 3 is positioned lower than the lower ends of the driven wheels 32. That is, in a state in which the four driven wheels 32 contact a road surface, the drive wheels 3 are pressed against the road surface by the elastic force of the suspensions 42.

The support 4 is located at a side edge portion of the bottom plate 12 in the car width direction. At the side edge portion of the bottom plate 12 in the car width direction, the two driven wheels 32 are located and aligned in the traveling direction. The support 4 is located between the two driven wheels 32 in the traveling direction. That is, the drive wheel 3 is located substantially at the center of the bottom plate 12 in the traveling direction between the two driven wheels 32 in the traveling direction.

The motor 2 is located, on the bottom plate 12, inside in the car width direction with respect to the support 4. The reducer 6 is integrally attached to the motor 2. The reducer 6 is coupled to an output shaft of the motor 2. An output shaft 61 of the reducer 6 extends in the car width direction. The reducer 6 is attached to an attachment plate 16 extending from the bottom plate 12. That is, the motor 2 is attached to the lower surface of the bottom plate 12 via the attachment plate 16 and the reducer 6. The motor 2 and the reducer 6 are located substantially at the center of the bottom plate 12 in the car width direction. The motor 2 is a servo motor. The motor 2 is controlled by the controller 9.

The transmission 5 has an output pulley 51 coupled to the motor 2, an input pulley 52 coupled to the drive wheel 3, and a belt 53 wound around the output pulley 51 and the input pulley 52. The output pulley 51 is located on the car body 1. That is, the position of the output pulley 51 with respect to the car body 1 is unchangeable. The input pulley 52 is located on the holder 41. That is, the position of the input pulley 52 with respect to the holder 41 is unchangeable.

The output pulley 51 is disposed on the output shaft 61 of the reducer 6. The rotation axis P of the output pulley 51 is coaxial with the rotation axis of the output shaft 61. That is, the output pulley 51 is indirectly coupled to the motor 2 via the reducer 6 so as to rotate accompanied with the motor 2. When the motor 2 operates, the speed of the rotary drive force of the motor 2 is reduced by the reducer 6, and thereafter, the rotary drive force is transmitted to the output pulley 51. The output pulley 51 is a geared pulley configured such that teeth parallel with the rotation axis P are aligned in the circumferential direction on the outer peripheral surface.

The input pulley 52 is unrotatably coupled to the drive wheel 3. The input pulley 52 rotates integrally with the drive wheel 3. That is, the input pulley 52 is directly coupled to the drive wheel 3 so as to rotate accompanied with the drive wheel 3. The input pulley 52 is coaxial with the rotation axis L of the drive wheel 3. The rotation axis L is also the rotation axis of the input pulley 52. The input pulley 52 is located outside the holder 41. In the car width direction, the input pulley 52 is located inside the holder 41. The input pulley 52 is located and aligned with the output pulley 51 in the traveling direction. That is, in the car width direction, the output pulley 51 and the input pulley 52 are located at the same position. The input pulley 52 is a geared pulley configured such that teeth parallel with the rotation axis L are aligned in the circumferential direction on the outer peripheral surface.

The belt 53 is an endless belt wound around the output pulley 51 and the input pulley 52. The belt 53 is a geared belt configured such that teeth parallel with each other are aligned in the circumferential direction on the inner peripheral surface. The belt 53 transmits rotation of the output pulley 51 to the input pulley 52. In this example, the diameter of the output pulley 51 is substantially the same as the diameter of the input pulley 52. Thus, rotation of the output pulley 51 is transmitted to the input pulley 52 with the same rotation speed. Note that the diameter of the output pulley 51 may be different from the diameter of the input pulley 52.

The second driver 10B is configured similarly to the first driver 10A. Note that the first driver 10A and the second driver 10B are located point-symmetrical with respect to the center of the bottom plate 12.

Specifically, the support 4 of the first driver 10A is located at a left side edge portion of the bottom plate 12, and on the other hand, the support 4 of the second driver 10B is located at a right side edge portion of the bottom plate 12. The drive wheel 3 of the first driver 10A and the drive wheel 3 of the second driver 10B are different from each other in a position in the car width direction, but are substantially the same as each other in a position in the traveling direction. That is, the drive wheel 3 of the first driver 10A and the drive wheel 3 of the second driver 10B are located and aligned in the car width direction, i.e., the right-left direction. In the first driver 10A, the suspension 42 is positioned at the front in the traveling direction with respect to the drive wheel 3, and the fixed end portion 41a of the holder 41 is positioned at the rear in the traveling direction with respect to the drive wheel 3. On the other hand, in the second driver 10B, the suspension 42 is positioned at the rear in the traveling direction with respect to the drive wheel 3, and the fixed end portion 41a of the holder 41 is positioned at the front in the traveling direction with respect to the drive wheel 3.

As a result, the motor 2 of the first driver 10A is located on one side (specifically, rear side) in the traveling direction with respect to the drive wheel 3 of the first driver 10A and the drive wheel 3 of the second driver 10B, and the second motor 2B is located on the other side (specifically, front side) in the traveling direction with respect to the drive wheel 3 of the first driver 10A and the drive wheel 3 of the second driver 10B.

Here, the motor being located on one or the other side in the traveling direction with respect to the drive wheel 3 of the first driver 10A and the drive wheel 3 of the second driver 10B does not mean that the motor 2, the drive wheel 3 of the first driver 10A, and the drive wheel 3 of the second driver 10B are aligned in the traveling direction, i.e., the motor 2, the drive wheel 3 of the first driver 10A, and the drive wheel 3 of the second driver 10B are the same as each other in a position in the car width direction. The motor 2, the drive wheel 3 of the first driver 10A, and the drive wheel 3 of the second driver 10B may or may not be aligned in the traveling direction. In this example, the motor 2, the drive wheel 3 of the first driver 10A, and the drive wheel 3 of the second driver 10B are not aligned in the traveling direction.

The drive wheel 3 of the first driver 10A and the drive wheel 3 of the second driver 10B are located substantially at the center of the bottom plate 12 in the traveling direction. Thus, in the traveling direction, the motor 2 of the first driver 10A and the motor 2 of the second driver 10B are separately located at the front and rear of the two drive wheels 3 so that the motors 2 and the drive wheels 3 can be located effectively using a space below the car body 1. Further, the weight balance of the motors 2 and the drive wheels 3 on the car body 1 can be achieved.

Further, in the configuration in which the drive wheel 3 of the first driver 10A and the drive wheel 3 of the second driver 10B are located on the right and left sides, the drive wheel 3 of the first driver 10A and the drive wheel 3 of the second driver 10B are independently driven. That is, the motor 2 of the first driver 10A and the motor 2 of the second driver 10B independently drive the drive wheels 3. Thus, the car body 1 can travel straight forward or rearward in the traveling direction in such a manner that the two drive wheels 3 are rotated in the same direction with the same rotation speed. Moreover, the car body 1 can turn in such a manner that the two drive wheels 3 are rotated with different rotation speeds and/or in different rotation directions.

The controller 9 controls operation of the robot arm 7. The controller 9 controls the operation with the end effector coupled to the tip end of the robot arm 7 as an external axis. The controller 9 controls the operation with the motors 2 as external axes. The controller 9 moves the traveling car 100 to a desired position, and causes the robot arm 7 to execute predetermined operation and processing.

The controller 9 has a processor, a storage, a memory, etc. The processor performs various types of arithmetic processing, and controls the entirety of the controller 9. For example, the processor includes a processor such as a central processing unit (CPU). The processor may include, for example, a micro controller unit (MCU), a micro processor unit (MPU), a field programmable gate array (FPGA), and a programmable logic controller (PLC). The storage stores programs to be executed by the processor and various types of data. The storage includes, for example, a non-volatile memory, a hard disc drive (HDD), and a solid state drive (SSD). The memory temporarily stores data etc. For example, the memory includes a volatile memory.

In the traveling car 100 configured in this manner, the drive wheel 3 is held by the holder 41 and the suspension 42 so as to rotate (i.e., swing) relative to the car body 1. The elasticity of the suspension 42 presses the drive wheel 3 against the road surface while absorbing asperities of the road surface. Thus, a state of the drive wheel 3 contacting the road surface is maintained.

The motor 2 is attached to the car body 1. The rotary drive force of the motor 2 is transmitted to the drive wheel 3 via the belt 53. Since the motor 2 does not rotate together with the holder 41, vibration of the drive wheel 3 transmitted to the motor 2 is reduced.

Figure 5:
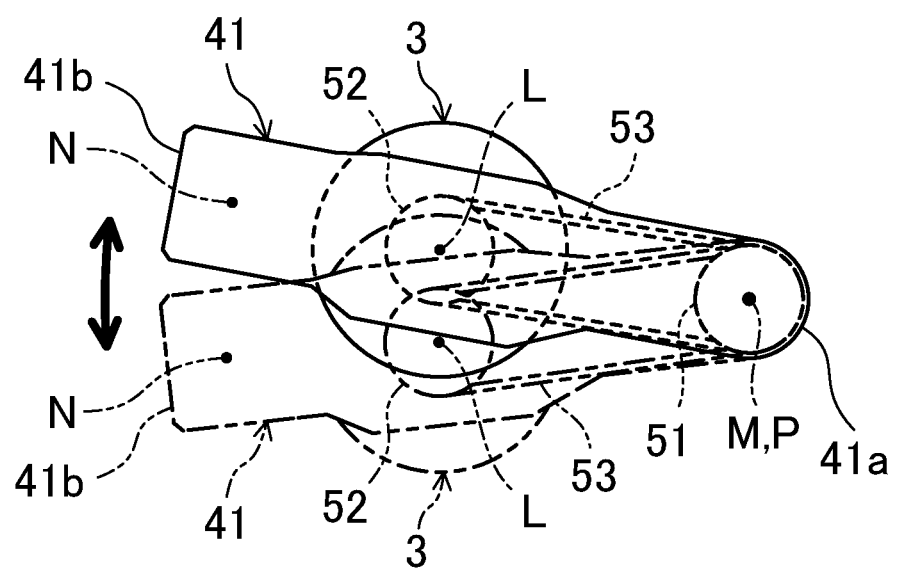
FIG. 5 is a schematic view of a drive wheel, a holder, etc. rotating along with extension and contraction of a suspension.

In addition, the rotation axis M of the holder 41 is located coaxial with the rotation axis P of the output pulley 51. The fixed end portion 41a of the holder 41 is aligned with the output pulley 51 in the car width direction, more specifically the direction of the rotation axis M, with separated from the output pulley 51. As shown in FIG. 5, the holder 41 rotates (i.e., swings) about the rotation axis M along with extension and contraction of the suspension 42, as described above. FIG. 5 is a schematic view of the drive wheel 3, the holder 41, etc. rotating along with extension and contraction of the suspension 42. Note that in FIG. 5, the holder 41 is rotated greater than actual rotation for the sake of easy understanding of displacement of the drive wheel 3 and the holder 41. Along with such rotation of the holder 41, the drive wheel 3 and the input pulley 52 also rotate about the rotation axis M. Since the rotation axis M and the rotation axis P are coaxial with each other, a distance between the rotation axis L of the input pulley 52 and the rotation axis P is constant even when the input pulley 52 rotates about the rotation axis M. That is, a center distance between the output pulley 51 and the input pulley 52 is unchangeable. As a result, the tension of the belt 53 wound around the output pulley 51 and the input pulley 52 is maintained constant. Accordingly, the rotary drive force of the motor 2 is properly transmitted to the drive wheel 3 without a decrease in the tension of the belt 53.

As described above, the traveling car 100 includes the car body 1 and the driver that causes the car body 1 to travel. The driver has the motor 2 (drive source) that is attached to the car body 1 and outputs the rotary drive force, the drive wheel 3, the support 4 that supports the drive wheel 3, and the transmission 5 that transmits the rotary drive force to the drive wheel 3. The support 4 has the holder 41 that rotatably supports the drive wheel 3 and is attached to the car body 1 so as to elastically rotate about the rotation axis M extending in the horizontal direction. The transmission 5 has the output pulley 51 that is coupled to the motor 2 and is located on the car body 1, the input pulley 52 that is coupled to the drive wheel 3 and is located on the holder 41, and the belt 53 wound around the output pulley 51 and the input pulley 51. The rotation axis M is located coaxial with the output pulley 51.

According to this configuration, the holder 41 that supports the drive wheel 3 is attached to the car body 1 so as to elastically rotate about the rotation axis M. By elastic rotation of the holder 41 about the rotation axis M, contact between the drive wheel 3 and the road surface is maintained while the asperities of the road surface are absorbed. The drive wheel 3 may vibrate due to the asperities of the road surface. However, since the motor 2 is attached not to the holder 41 but to the car body 1, vibration of the drive wheel 3 transmitted to the drive wheel 3 is reduced. The rotary drive force of the motor 2 is transmitted to the drive wheel 3 via the belt 53 wound around the output pulley 51 coupled to the motor 2 and the input pulley 52 coupled to the drive wheel 3. Since the output pulley 51 is located on the car body 1, the output pulley 51 does not displace even when the holder 41 rotates about the rotation axis M. On the other hand, since the input pulley 52 is located on the holder 41, the input pulley 52 also rotates about the rotation axis M along with rotation of the holder 41 about the rotation axis M. Since the rotation axis M is located coaxial with the output pulley 51, the input pulley 52 rotates about the output pulley 51. Since the center distance between the output pulley 51 and the input pulley 52 is unchangeable, the tension of the belt 53 wound around the output pulley 51 and the input pulley 52 is maintained constant. As a result, the rotary drive force of the motor 2 is properly transmitted to the drive wheel 3 without the decrease in the tension of the belt 53.

The support 4 further has the suspension 42 that elastically supports the holder 41 on the car body such that the holder 41 is rotatable about the rotation axis M.

According to this configuration, the holder 41 is elastically rotatable about the rotation axis M by the suspension 42. The suspension 42 causes the drive wheel 3 to contact the road surface while absorbing the asperities of the road surface.

The suspension 42 is attached to the car body 1 so as to rotate about the axis parallel at least with the rotation axis M.

According to this configuration, the suspension 42 rotates about the axis parallel with the rotation axis M at the portion attached to the car body 1, and therefore, the holder 41 can smoothly rotate about the rotation axis M.

The suspension 42 is attached to the car body 1 via the spherical plain bearing 15.

According to this configuration, the suspension 42 rotatable about the axis parallel with the rotation axis M can be easily attached to the car body 1.

The traveling car 100 further includes the driven wheel 32 that is attached to the car body 1 and is rotatable about the axis extending in the horizontal direction.

According to this configuration, the traveling car 100 includes the drive wheel 3 and the driven wheel 32. At least the drive wheel 3 is held by the holder 41 and the suspension so as to elastically rotate about the rotation axis M extending in the horizontal direction. Thus, contact of the drive wheel 3 and the driven wheel 32 with the road surface can be stably maintained.

The traveling car 100 further includes the reducer 6 that is coupled to the motor 2 and reduces the speed of the rotary drive force, and the output pulley 51 is disposed on the output shaft 61 of the reducer 6.

According to this configuration, the output pulley 51 is indirectly coupled to the motor 2 via the reducer 6. Even with this configuration, the rotary drive force of the motor 2 can be properly transmitted to the drive wheel 3.

The driver includes the first driver 10A and the second driver 10B, and the drive wheel 3 of the first driver 10A and the drive wheel 3 of the second driver 10B are independently driven.

According to this configuration, the car body 1 can travel straight forward or rearward in the traveling direction in such a manner that the two drive wheels 3 are rotated in the same direction with the same rotation speed. Moreover, the car body 1 can turn in such a manner that the two drive wheels 3 are rotated with different rotation speeds and/or in different rotation directions.

The drive wheel 3 of the first driver 10A and the drive wheel 3 of the second driver 10B are located and aligned in the right-left direction when the traveling direction by the first driver 10A and the second driver 10B is taken as the front-rear direction. The motor 2 of the first driver 10A is located on one side in the traveling direction with respect to the drive wheel 3 of the first driver 10A and the drive wheel 3 of the second driver 10B. The motor 2 of the second driver 10B is located on the other side in the traveling direction with respect to the drive wheel 3 of the first driver 10A and the drive wheel 3 of the second driver 10B.

According to this configuration, the motor 2 of the first driver 10A and the motor 2 of the second driver 10B are separately located on one and the other sides in the traveling direction with respect to the drive wheel 3 of the first driver 10A and the drive wheel 3 of the second driver 10B. With this configuration, the weight balance on the car body 1 can be achieved.

The traveling car 100 further has the robot arm 7 that is mounted on the car body 1.

Other Embodiments

The embodiment has been described above as an example of the technique disclosed in the present application. However, the technique in the present disclosure is not limited to above, and is also applicable to embodiments to which changes, replacements, additions, omissions, etc. are made as necessary. The components described above in the embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

For example, the traveling car 100 does not necessarily include the robot arm 7. Moreover, the traveling car 100 is not limited to the AGV, and an arbitrary configuration may be employed as long as a car body and a driver are included therein.

The traveling car 100 is only required to include at least one driver. For example, the traveling car 100 may include one driver and driven wheels. In this case, some of the driven wheels may have a steering function.

The driven wheels 32 are not limited to the four wheels, and may be three or less or five or more wheels. For example, the number of driven wheels 32 may be such a number that the traveling car 100 can be travelably supported only by the driven wheels 32 without the drive wheels 3. For example, the traveling car 100 may have three driven wheels 32 located on the vertices of a triangle.

The holder 41 is only required to be attached to the car body 1 so as to elastically rotate about the rotation axis extending in the horizontal direction, and is not limited to being supported by the suspension 42. For example, the holder 41 may be elastically held on the car body 1 via an elastic member such as anti-vibration rubber.

Attachment of the suspension 42 to the car body 1 is not limited to the spherical plain bearing 15. For example, a shaft parallel with the rotation axis M of the holder 41 may be disposed on the car body 1, and the suspension 42 may be rotatably attached to such a shaft. Alternatively, in a case where the suspension 42 has the elasticity not only in the longitudinal direction thereof but also in the bending direction thereof, the suspension 42 may be attached in a fixed manner (i.e., unrotatably) to the car body 1. In this case, by elastic bending deformation of the suspension 42, the holder 41 can rotate about the rotation axis M.

The output pulley 51 is not necessarily disposed on the reducer 6, but may be directly disposed on the motor 2. The speed of the rotary drive force from the motor 2 may be reduced between the input pulley 52 and the drive wheel 3. The diameter of the input pulley 52 may be greater than the diameter of the output pulley 51.

The invention claimed is:

1. A traveling car comprising:
   a car body; and
   a driver that causes the car body to travel,
   wherein the driver has a drive source that is attached to the car body and outputs rotary drive force, a drive wheel, a support that supports the drive wheel, and a transmission that transmits the rotary drive force to the drive wheel,
   the support has a holder that rotatably supports the drive wheel and is attached to the car body so as to elastically rotate about a rotation axis extending in a horizontal direction,
   the transmission has an output pulley that is coupled to the drive source and is located on the car body, an input pulley that is coupled to the drive wheel and is located on the holder, and a belt wound around the output pulley and the input pulley, and the rotation axis is located coaxial with the output pulley.

2. The traveling car of claim 1, wherein
the support further has a suspension that elastically supports the holder on the car body such that the holder is rotatable about the rotation axis.

3. The traveling car of claim 2, wherein
the suspension is attached to the car body so as to rotate about an axis parallel at least with the rotation axis.

4. The traveling car of claim 3, wherein
the suspension is attached to the car body via a spherical plain bearing.

5. The traveling car of claim 1, further comprising:
a driven wheel that is attached to the car body and is rotatable about an axis extending in the horizontal direction.

6. The traveling car of claim 1, further comprising:
a reducer that is coupled to the drive source and reduces a speed of the rotary drive force,
wherein the output pulley is disposed on an output shaft of the reducer.

7. The traveling car of claim 1, wherein
the driver includes a first driver and a second driver, and a drive wheel of the first driver and a drive wheel of the second driver are independently driven.

8. The traveling car of claim 7, wherein
the drive wheel of the first driver and the drive wheel of the second driver are located and aligned in a right-left direction when a traveling direction by the first driver and the second driver is taken as a front-rear direction,
a drive source of the first driver is located on one side in the traveling direction with respect to the drive wheel of the first driver and the drive wheel of the second driver, and
a drive source of the second driver is located on the other side in the traveling direction with respect to the drive wheel of the first driver and the drive wheel of the second driver.

9. The traveling car of claim 1, further comprising:
a robot arm that is mounted on the car body.

* * * * *